United States Patent [19]

Gabriel et al.

[11] Patent Number: 4,864,824
[45] Date of Patent: Sep. 12, 1989

[54] THIN FILM SHAPE MEMORY ALLOY AND METHOD FOR PRODUCING

[75] Inventors: Kaigham J. Gabriel, Fair Haven, N.J.; Mehran Mehregany, Cambridge, Mass.; James A. Walker, Howell, N.J.

[73] Assignee: American Telephone and Telegraph Company, AT&T Bell Laboratories, Murray Hill, N.J.

[21] Appl. No.: 265,176

[22] Filed: Oct. 31, 1988

[51] Int. Cl.[4] ............................................. F03G 7/06
[52] U.S. Cl. ........................................ 60/527; 60/528
[58] Field of Search .......................... 60/527, 528, 529

[56] References Cited

U.S. PATENT DOCUMENTS 3,203,166  8/1965  Flanagan .............................. 60/528
4,700,541  10/1987  Gabriel et al. .................... 60/527 X Primary Examiner—Allen M. Ostrager
Attorney, Agent, or Firm—Jerry W. Herndon

[57] ABSTRACT

An actuator including a device made of thin film shape memory material mounted to a substrate. The thin film device is deformed from its original shape. Thereafter, the device is heated to restore the device to its original shape. Motion of the device occurs in the deforming and restoring steps, which is used to produce some form of work result.

20 Claims, 6 Drawing Sheets

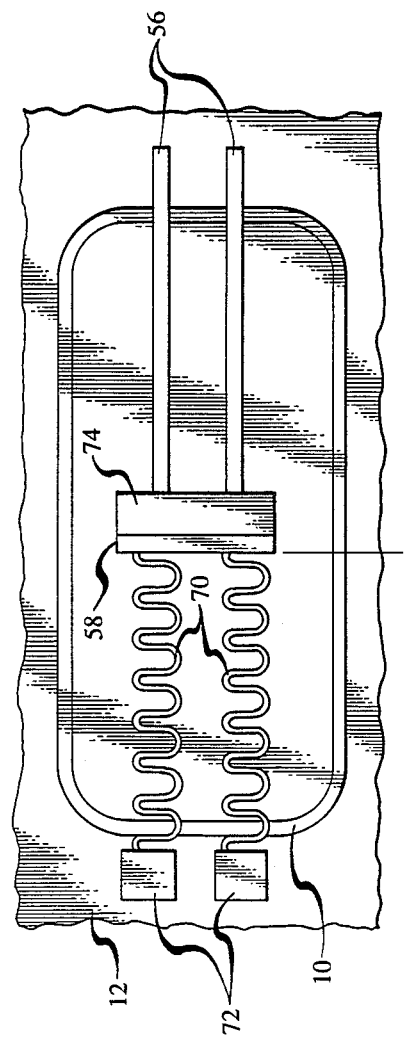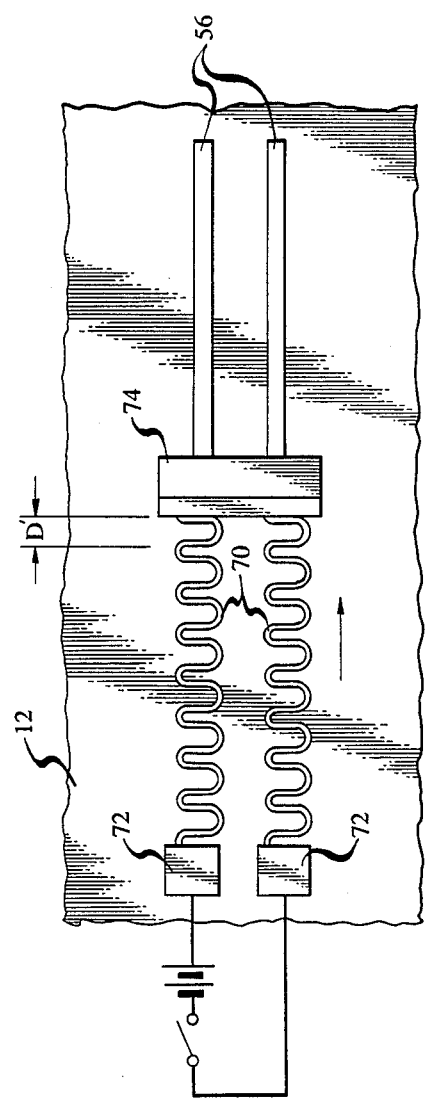
FIG. 7
FIG. 8

THIN FILM SHAPE MEMORY ALLOY AND METHOD FOR PRODUCING

TECHNICAL BACKGROUND

The invention relates to the field of micromechanics in general and in particular to the use of shape memory alloys in the realization of miniature and micro devices and actuators.

BACKGROUND OF THE INVENTION

Shape memory alloys (SMA) form a group of metals which have the interesting property that, when deformed while below a martensite finish temperature and then heated to above an austenite temperature, the alloy returns to its shape existing before the deformation. Actuating devices made with SMA technology for large scale applications are well known. Typical actuators employ a SMA wire that is stretched and a return bias spring mechanically connected in some manner to the SMA device. When such a SMA device is heated, by current or other means, the wire contracts to perform some work function. The bias spring returns the actuator to its original position after cooling. Hashimoto et al discuss one example of this type of actuator with reference to FIG. 4a of their paper "Application of Shape Memory Alloy to Robotic Actuators", *Journal of Robotic Systems*, Vol. 2(1), Mar. 1985.

A second type of actuator, called a differential type, uses two SMA devices connected mechanically in series. Heating of one device shrinks the apparatus in one direction while heating of the second device shrinks the apparatus in the opposing direction. Actuators of the bias and differential types have been applied to such macro applications as controlling movement of robotic joints.

Homna et al have attempted to apply SMA technology to microactuator technology by using thin (0.2 mm diameter) SMA wire and by heating the wire with pulsed electrical current. Their efforts are discussed in two papers, "Digital Actuator Applied Shape Memory Effect", *Transactions of the Japan Society of Mechanical Engineers*, Vol. 49, pp. 2163–2169, 1984, and "Tactile Detection Performed by SME Actuator", *Bulletin of the Japan Society of Precision Engineering*, Vol. 18, Sept. 1984, pp. 274–276,. These microactuators use bias springs to return the SMA portion of an actuator to its deformed state after cooling. The use of such bias springs in microtechnology is undesirable because of the physical size requirements imposed, among other things, by the biasing device, and because of slow time constants associated with cooling.

SUMMARY OF THE INVENTION

U.S. Pat. No. 4,700,541 discloses a miniature or micro actuator using SMA wire technology. The SMA wire is twisted about its longitudinal axis and its ends are then fixedly mounted to a suitable housing. A control member, such as a lever or the like, is attached to the wire at a suitable location along its length. A plurality of electrical connections to the wire define different longitudinal sections of the wire to which voltages are applied to different sections of the wire to heat the respective sections and thereby cause controllable rotation of the SMA wire and the control member.

The last-mentioned SMA wire actuator is particularly useful for miniature and micro applications. However, there may be limits on the extent to which such actuators can be reduced in size, an important factor which may limit its micro applications. Another disadvantage of the present SMA actuator art is the inability to batch fabricate such actuators.

The invention is an actuator including a device made of thin film shape memory material mounted at some location on the device to a substrate. The shape memory material is capable of restoring itself to an original shape when heated above a first temperature after being deformed while below a second temperature. Some means for deforming the thin film device is provided. The device is thereafter heated to a temperature above the first temperature to restore the device to its original shape. Motion of the device occurs in the deforming and restoring steps, which is used to produce some form of work result.

In a preferred embodiment, the means for deforming is a second thin film device also made of a shape memory material. The second device is also fixedly connected to the substrate at some location on the second device. In the preferred embodiment, the dimensions of the first and second devices are different. The first device and the second device are connected to each other so that the second device may act to deform the first device. In this embodiment, both the first and the second devices comprise thin film springs. Preferably, the shape memory material is a titanium and nickel alloy commonly called TiNi or nitinol, although other shape memory materials may be used as well. Preferably, the substrate is made of silicon, although many other substrate materials may be used.

In another embodiment, the means for deforming the shape memory device is a layer of elastic material connected to the susbstrate at some location and connected to the device at a different location. Preferably, this elastic material is polyimide.

Although heating of the first device, and the second device when it is present, may be accomplished in a variety of ways, the simplest way is by electric current passed through the device or devices themselves.

The actuator may be manufactured by a process of depositing a sacrificial layer of material onto a portion of the substrate. A thin film of shape memory material is then deposited onto sections of the substrate and the sacrificial layer. A suitable deformable device is made from the film and the sacrificial layer is removed, preferably by wet or dry etching. In the preferred embodiment, the device and the means for deforming the device may be obtained in the same processing steps. In the second disclosed embodiment involving an elastic material for deforming the device, an additional processing step is required to form the elastic layer.

BRIEF DESCRIPTION OF THE DRAWING

In the drawing,

FIGS. 7 and 8 show the same views for the alternative embodiment as FIGS. 3 and 4 show for the preferred embodiment;

DETAILED DESCRIPTION

Figure 1:
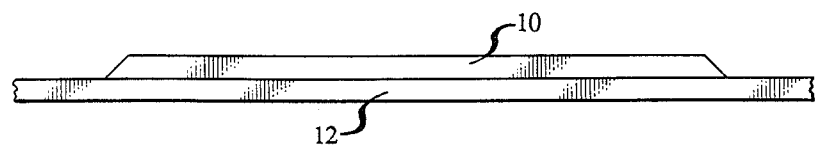
FIGS. 1 and 2 illustrate the processing steps used to form a preferred embodiment of an actuator.
Figure 2:

FIGS. 1-2 show illustrative processing steps for forming a thin film SMA (Shape Memory Alloy) actuator. In FIG. 1, a sacrificial layer 10 is shown deposited onto a substrate 12. A SMA thin film actuating device is formed on top of the sacrificial material, as discussed below, and the sacrificial layer is removed. The substrate 12 is made of any suitable rigid or semirigid material. The substrate 12 can be electrically insulating or non-insulating depending on the method used to heat the SMA material. If resistive heating methods are used, the substrate should be nonconductive or the SMA material should be electrically insulated from the substrate 12 by a layer of silicon dioxide or other suitable material. The sacrificial layer 10 is made of any material which can be removed by etching or other means without affecting the SMA or actuator structures in the removal process. Suitable materials and methods of removing the sacrificial layer 10 are discussed in more detail below.

Figure 3:
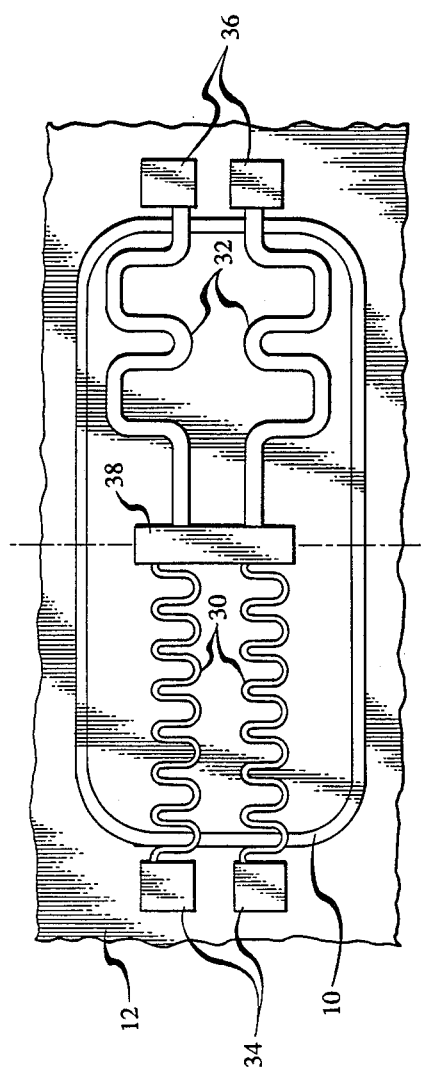
FIG. 3 shows a top view of the preferred patterned actuator before the underlying layer of sacrificial material is removed.

To form the actuating device, a thin film 20 of SMA material is deposited onto the substrate 12 as shown in FIG. 2. This film can be deposited by any suitable means. The preferred method is by direct current sputter deposition of Titanium-Nickel alloy (TiNi). Another type of SMA material can also be used. Suitable sputter sources of such materials can be obtained from Innovative technologies International, Beltsville, Md., among other sources. After the SMA film is deposited as shown in FIG. 2, the surface of the film is patterned to form the desired SMA device. One such device consists of a set of springs with each spring comprised of sinusoidal shaped coils, as shown in FIG. 3. The pattern is photolithographically defined on the film 20 using standard photoresist. In the example of FIG. 3, the substrate 12 is made of silicon and the sacrificial layer 10 is polyimide. The SMA film is then etched in an acid bath to remove all portions of the film except that necessary to form the springs in thin film form. A one to one mixture of nitric acid based etchant and hydrofluoric acid based etchant is satisfactory for etching this TiNi film. Suitable etchants are available from Transene Company Inc., Rowley, Mass.

FIG. 3 shows the surface of the thin film 20 after it has been etched to form the actuating device and before the sacrificial layer 10 is removed. The sacrificial layer is depicted here by the cross-hatched portion of the figure. This illustrative device comprises two pairs of TiNi springs, 30 and 32. In principle, a single spring 30 and a single spring 32 could be used, rather than pairs. However, the use of spring pairs more evenly distributes forces and reduces the tendency of the device to produce angular motion. The use of dual spring also provides a current loop for heating the spring coils without attaching a wire to the movable pad 38. The overall dimensions of spring pair 32 are larger than the overall dimensions of spring pair 30. Each of the springs of pair 30 are connected to respective contact pads 34. Similarly, the springs 32 are connected to respective pads 36. In addition, the spring pairs 30 and 32 are connected to each other at a common contact pad 38. All of these portions 30, 32, 34, 36 and 38 are formed of the TiNi alloy during the patterning process.

Figure 4:
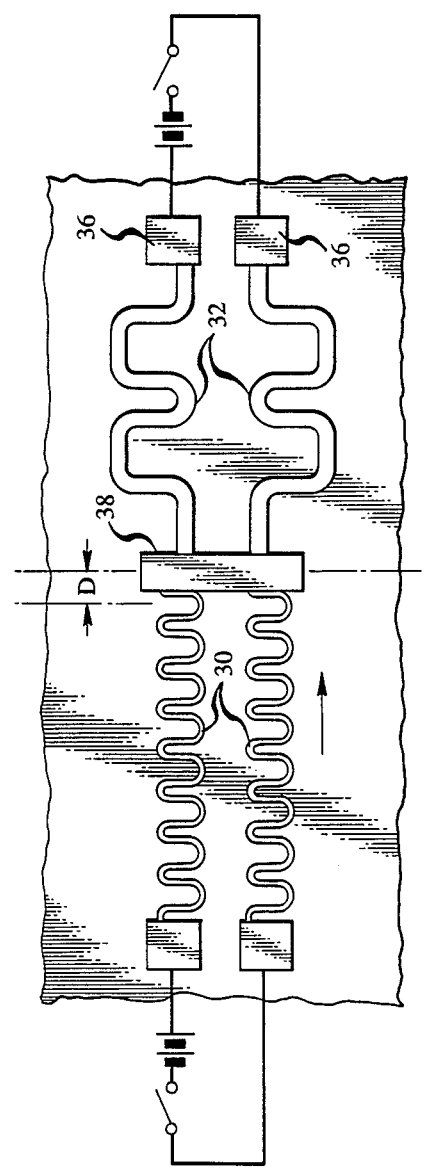
FIG. 4 shows the same view as FIG. 3 after the underlying layer of sacrificial material is removed.

Next, the sacrificial material 10 underlying the thin film device is removed. In the case depicted here, dry plasma etching with a gas mixture of oxygen and sulfur hexafluoride is the preferred technique of removing the sacrificial polyimide material. This etching process is sufficiently isotropic to completely undercut the SMA structures, thereby removing essentially all the sacrificial material. After the etching is completed, the spring pairs 30 and 32 and the common pad 38 are free to move, as shown in FIG. 4. Because the dimensions of spring pair 32 are larger than the dimensions of spring pair 30, the force associated with the residual stress of pair 32 is greater than the force associated with the spring pair 30. This causes spring pair 32 to contract, thereby expanding the coils of spring pair 30 and laterally moving the common pad 38 to the right by some distance D. The mentioned residual stress always results in deposition processes from a variety of factors that are controllable to some degree. Factors such as the thermal coefficients of expansion of the substrate and the deposited material and the temperature at which deposition is made are typical factors affecting the residual stress. If the coils of pair 30 are now heated to above the austenite temperature, they will try to recover their original deposited shape existing before the sacrificial layer 10 was removed. As a result, the coils of spring pair 30 contract and pull the common pad 38 to the left a distance D. A lever, air directing tube or the like may be attached to the common pad 38, for instance, and used to accomplish work as the pad 38 is moved back and forth. When the heat to spring pair 30 is removed, the pad returns to its original position. A number of ways of controlling the movement of pad 38 are available. For instance, pad 38 may be moved with additional force by heating both spring pairs 30 and 32 simultaneously. Heat is illustratively generated to the coils by electrical current. In FIG. 3, current is supplied to the spring pairs 30 and 32 by batteries 60 and 62, respectively, in accordance with the position of switches 64 and 66. In practice, batteries 60, 62 and switches 64, 66 would likely be replaced with appropriate automatic control circuits.

Figure 5:
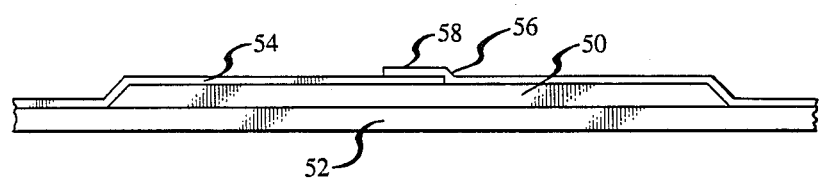
FIGS. 5 and 6 illustrate the processing steps used to form an alternative embodiment of an actuator in which the device is deformed by an elastic material.
Figure 6:
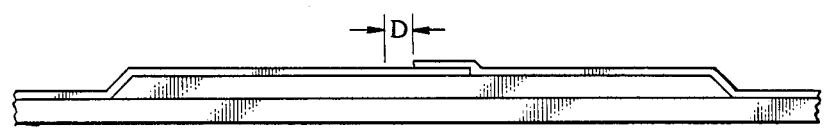

FIGS. 5 and 6 illustrate processing steps for building a different embodiment of a thin film actuator. This embodiment substitutes for the spring pair 32 of FIG. 3 a passive biasing material having a degree of elasticity, e.g. polyimide. Thus, with reference to FIG. 5, a sacrificial layer 50 of material is deposited onto a substrate 52, as before. In this embodiment, the preferred sacrificial material is gold. Next, a layer 54 of SMA material such as TiNi is deposited onto a portion of the sacrificial material and a portion of the exposed substrate. A layer of the polyimide material is then deposited onto the remaining portions of the substrate and sacrificial material in such a way as to overlap the SMA material in the region 58. With reference to FIG. 7, which shows a top view of the actuator, coil spring pair 70 correponds to spring pair 30 of FIG. 3 and is formed in the same manner as in FIG. 3 by photoresist methods. In addition, the polyimide layer 56 is patterned into biasing strips 58 which connect to a portion of the polyimide that overlaps the SMA material in the region 58. Portion of the strips 58 on the right are in contact with the substrate 52. Contact pads 72 are part of the patterned SMA layer and are also in contact with the substrate 52. The sacrificial layer 50 is now removed by wet etching to result in the structure shown in FIG. 8. The portions of the SMA and polyimide layers which are in contact with the substrate remain connected to the substrate. The portions of the SMA and polyimide deposited over the sacrificial layer are free to move once the sacrificial layer has been removed.

The polyimide biasing strips 58 have the property that when they are released by removal of the sacrificial layer, the material shrinks by approximately 1% in each dimension. This shrinkage causes the individual springs of spring pair 70 to expand from their original shape and the contact pad to move to the right a small amount D', as shown in FIG. 8. As was described with respect to the actuator of FIG. 3, the contact pad 74 may be made to move back and forth by heating and cooling of the coil spring pair 70. The heating may again be accomplished with electric current through the springs, or by other means.

Figure 9:
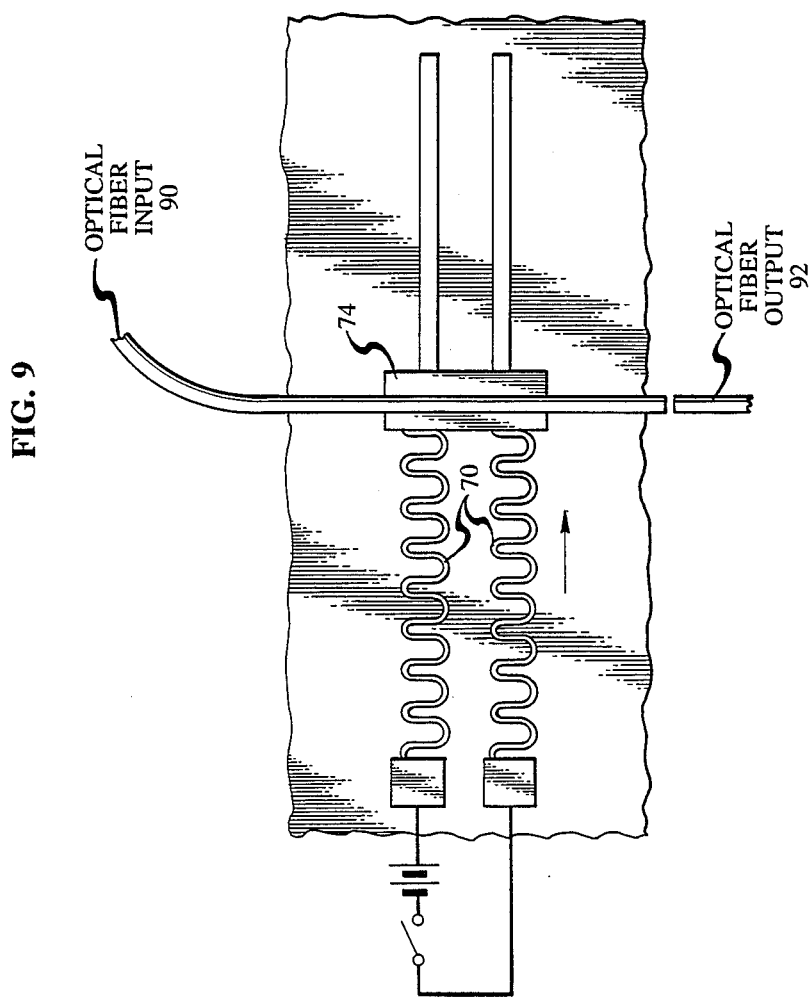
FIG. 9 shows an illustrative application of the actuator as an optical fiber switch.

FIG. 9 depicts the above actuator in a top view, with the addition of a structural member 90, which can be used to perform work, attached to the contact pad 74. In FIG. 9, the structural member 90 is represented as an optical fiber and the actuator is used as an optical fiber switch. By heating the spring pair 70, the optical fiber 90 can be optically aligned and misaligned with a stationary optical fiber 92.

Figure 10:
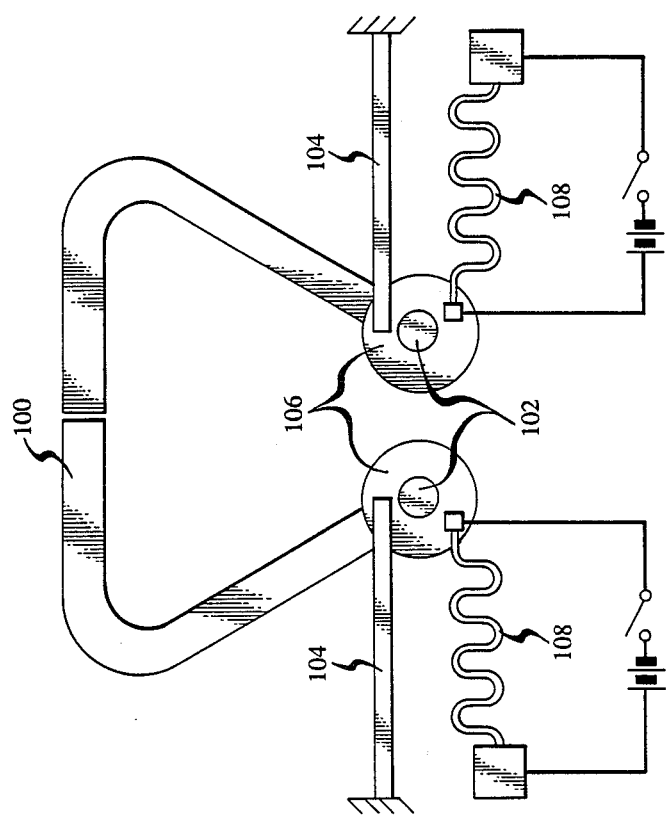
FIG. 10 shows an illustrative application of the actuator to operate a tool such as a pair of micro-tongs.

FIG. 10 illustrates another application of an actuator. In this application a thin-film SMA actuator is used to provide rotary motion of a pair of tongs 100 around passive rotary pin joints 102. The tongs may be made of polysilicon and thus machined as part of the process of manufacturing the actuator. In this illustrative embodiment structural members 104 are both polyimide layers which reside partly in free space and have shrunk as in the prior described actuator. The members 104 are connected to rotary bushings 106 on the tongs 100. As a result of the shrinkage, the tongs 100 have been opened. By now heating and cooling the SMA thin film members 108, the tongs may be repetitively opened and closed.

Figure 11:
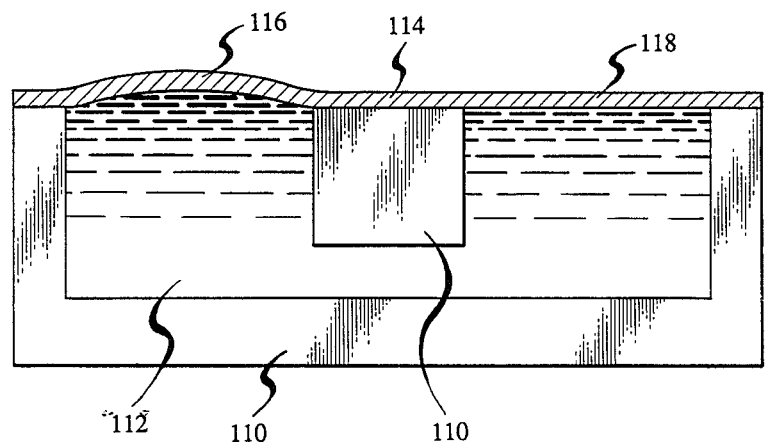
FIG. 11 illustrates dynamically and thermally operated embodiment of a thin film actuator.

FIG. 11 shows still another embodiment of a thin film actuator. This embodiment is substantially different from the ones discussed above in that it uses hydraulic as well as thermal principles to operate the actuator. FIG. 11 is a cross-sectional view of a vessel 110. In this illustrative embodiment, the vessel is assumed to be made of silicon. The vessel contains a U shaped cavity 112 which is sealed with a thin film 114 of shape memory material. Obviously, other vessel shapes could be used as well. The cavity 114 is filled with a fluid under slight pressure. The pressure causes blisters in the thin film 114 to appear in the regions 116 and 118 which are in contact with the fluid in the cavity 112. FIG. 11 does not show this equilibrium state. Rather, FIG. 11 shows a state that results when heat is applied to the region 118 of the thin film 114. When such heat is applied, the heated region of the SMA film assumes as original non-distorted flat shape. This, in turn, increases the pressure on the film in the region 116, causing the blister in this region to become larger. If sufficient heat is now applied to region 116, rather than to region 118, the blister at 116 will disappear and a blister larger than that of the equilibrium state will appear in region 118. This shifting of blisters may be used to produce a work function, such as the operation of a microswitch, or the like.

Heat may be applied to the blister regions resistively or by other means. One way to apply resistive heating is to provide electrical contacts on opposite sides of each blister region for the application of voltage. To more evenly distribute the flow of current across a blister region, and thereby more evenly heat the region, each contact preferably should be semicircular and have arc angles approaching 180 degrees.

It is understood that the above-described arrangements are only illustrative of the principles of thin-film SMA actuators, and that other arrangements may be devised by those skilled in the art without departing from the spirit and scope of the invention.

What is claimed:

1. An actuator comprising
   a substrate,
   a first thin film device deposited onto the substrate, the device being made of a shape memory material having the property of restoration to an original shape when heated above a first temperature after being deformed while below a second temperature, the device being fixedly connected to the substrate at at least one location,
   means for deforming the thin film device while it is below the second temperature, and
   means for heating the device to a temperature above the first temperature.

2. The actuator of claim 1 wherein the thin film device is made of a shape memory alloy.

3. The actuator of claim 2 wherein the device is a spring.

4. The actuator of claim 2 wherein the shape memory alloy comprises a titanium and nickel alloy.

5. The actuator of claim 1 wherein the means for deforming further comprises
   a second thin film device made of a shape memory material fixedly connected to the substrate at at least a second location, the first and the second device being fixedly connected to each other either directly or indirectly through intervening members.

6. The actuator of claim 5 wherein the second device is made of a shape memory alloy.

7. The actuator of claim 6 wherein the second device comprises a spring.

8. The actuator of claim 5 wherein the first and the second device are of different dimensions.

9. The actuator of claim 1 or claim 5 wherein the substrate comprises silicon.

10. The actuator of claim 1 or claim 5 in which the device and the means for deforming are connected in cascade either directly or through intervening members.

11. The actuator of claim 5 wherein the means for heating the device further comprises means for selectively supplying electrical current to the first and second devices.

12. The actuator of claim 2 or 11 further comprising means for selectively supplying current to the second device.

13. The actuator of claim 1 further comprising a member attached to the device for performing a work function.

14. The actuator of claim 13 wherein the member is a lever.

15. The actuator of claim 13 wherein the member is an optical fiber.

16. The actuator of claim 1 wherein the means for deforming further comprises
   a film of elastic material connected to the substrate at one end thereof and fixedly connected to the thin film device at an opposite end.

17. The actuator of claim 16 wherein the elastic material is polyimide.

18. The actuator of claim 1 wherein the substrate comprises a vessel having a cavity with at least one opening, the means for deforming comprises a fluid under pressure inside the cavity, wherein the thin film seals at least one opening to the cavity.

19. A process of manufacturing a thin film actuating device comprising the steps of
   (a) depositing onto a substrate a sacrificial layer of material,
   (b) depositing onto exposed sections of the substrate and onto the sacrificial layer a film of a shape memory material having the property of restoration to an original shape when heated above a first temperature after being deformed while below a second temperature,
   (c) selectively removing said film by photolithographic methods to make a deformable device, said device extending past the sacrificial layer and thereby contacting the substrate at some location, and
   (d) removing the sacrificial layer.

20. The process of claim 19 wherein step (c) further comprises making a second deformable device connected to the first-mentioned device and to at least another location on the substrate.

* * * * *